United States Patent
Schiroky

(10) Patent No.: US 10,669,601 B2
(45) Date of Patent: Jun. 2, 2020

(54) HIGHLY ALLOYED STAINLESS STEEL FORGINGS MADE WITHOUT SOLUTION ANNEAL

(71) Applicant: Swagelok Company, Solon, OH (US)

(72) Inventor: Gerhard H. Schiroky, Aurora, OH (US)

(73) Assignee: SWAGELOK COMPANY, Solon, OH (US)

( * ) Notice: Subject to any disclaimer, the term of this patent is extended or adjusted under 35 U.S.C. 154(b) by 262 days.

(21) Appl. No.: 15/371,455

(22) Filed: Dec. 7, 2016

(65) Prior Publication Data

US 2017/0166986 A1  Jun. 15, 2017

Related U.S. Application Data

(60) Provisional application No. 62/267,077, filed on Dec. 14, 2015.

(51) Int. Cl.
| | |
|---|---|
| *C21D 8/00* | (2006.01) |
| *B21J 1/00* | (2006.01) |
| *C22C 38/22* | (2006.01) |
| *C21D 1/40* | (2006.01) |
| *C21D 1/42* | (2006.01) |

(52) U.S. Cl.
CPC .............. *C21D 8/005* (2013.01); *B21J 1/003* (2013.01); *C21D 1/40* (2013.01); *C21D 1/42* (2013.01); *C22C 38/22* (2013.01)

(58) Field of Classification Search
None
See application file for complete search history.

(56) References Cited

U.S. PATENT DOCUMENTS

| | | | |
|---|---|---|---|
| 3,149,416 | A | 9/1964 | Moore |
| 4,242,150 | A | 12/1980 | Maxwell |
| 4,721,600 | A | 1/1988 | Maehara et al. |
| 4,832,765 | A | 5/1989 | DeBold et al. |
| 4,994,118 | A | 2/1991 | Pircher et al. |
| 5,196,073 | A | 3/1993 | Liljas et al. |
| 5,415,712 | A | 5/1995 | Thamboo |
| 5,494,636 | A | 2/1996 | Dupoiron et al. |
| 5,976,275 | A | 11/1999 | Yonezawa et al. |
| 6,576,068 | B2 | 6/2003 | Grubb et al. |
| 6,896,747 | B2 | 5/2005 | Hauser et al. |
| 7,922,840 | B2 | 4/2011 | Schuster et al. |
| 8,043,446 | B2 | 10/2011 | Jung et al. |
| 8,105,447 | B2 | 1/2012 | Oikawa et al. |
| 8,172,959 | B2 | 5/2012 | Sakaguchi et al. |
| 8,506,729 | B2 | 8/2013 | Oikawa et al. |
| 8,603,263 | B2 | 12/2013 | Kaminaka et al. |
| 2006/0034724 | A1 | 2/2006 | Hamano et al. |

(Continued)

OTHER PUBLICATIONS

International Search Report and Written Opinion from PCT/US16/65264 dated Mar. 2, 2017.

(Continued)

*Primary Examiner* — Colleen P Dunn
*Assistant Examiner* — Anthony M Liang
(74) *Attorney, Agent, or Firm* — Calfee, Halter & Griswold LLP

(57) ABSTRACT

The post forging solution anneal step normally carried out on hot forgings made from highly alloyed metals can be eliminated while still avoiding the formation of deleterious intermetallic phases by adopting a number separate features in connection the way the forging is made.

17 Claims, 2 Drawing Sheets

(56) References Cited

U.S. PATENT DOCUMENTS

| | | |
|---|---|---|
| 2006/0243356 A1 | 11/2006 | Oikawa et al. |
| 2008/0141826 A1 | 6/2008 | Marya et al. |
| 2008/0308198 A1 | 12/2008 | Sakaguchi et al. |
| 2009/0129967 A1 | 5/2009 | Goller |
| 2010/0000636 A1 | 1/2010 | Bonnefois et al. |
| 2011/0250088 A1 | 10/2011 | Samuelsson et al. |
| 2013/0032256 A1 | 2/2013 | Oliver et al. |
| 2013/0174948 A1 | 7/2013 | Peultier et al. |
| 2013/0312880 A1 | 11/2013 | Motoya et al. |
| 2014/0041768 A1 | 2/2014 | Nagao et al. |
| 2014/0137994 A1 | 5/2014 | Ueyama |
| 2014/0219856 A1 | 8/2014 | Oliver et al. |
| 2014/0238552 A1 | 8/2014 | Q |
| 2014/0255719 A1 | 9/2014 | Forbes |
| 2015/0129093 A1 | 5/2015 | Q |
| 2016/0024626 A1 | 1/2016 | Roch |

OTHER PUBLICATIONS

Paulraj, P., et al. "Effect of Intermetallic Phases on Corrosion Behavior and Mechanical Properties of Duplex Stainless Steel and Super-Duplex Stainless Steel", Adv. in Science and Technology Research Journal, vol. 9, No. 27, Sep. 2015, pp. 87-105.

Ambrell Induction Heating Solutions, "Precision Induction for Brazing", Jan. 19, 2013, URL: http://www.azom.com/article.aspx?ArticleID=8064, p. 1-2.

Nilsson, "Super duplex stainless steels", Materials Science and Technology, Aug. 1992, vol. 8, pp. 685-700.

Sun Mi Kim, et al. "Effect of Heat Treatment on Mechanical Properties of Super Duplex Stainless Steel", Advanced Materials Research vols. 89-91 (2010), pp. 290-294.

Search Report from European Application No. 16876403.3 dated Jul. 23, 2019.

HIGHLY ALLOYED STAINLESS STEEL FORGINGS MADE WITHOUT SOLUTION ANNEAL

RELATED APPLICATIONS

This application claims priority to and all benefit of U.S. Provisional Patent Application Ser. No. 62/267,077, filed on Dec. 14, 2015, for HIGHLY ALLOYED STAINLESS STEEL FORGINGS MADE WITHOUT SOLUTION ANNEAL, the entire disclosure of which is fully incorporated herein by reference.

BACKGROUND

Highly alloyed metals, i.e., metal alloys containing substantial amounts of additional metal elements other than their base metal elements, exhibit many desirable properties including superior strength and corrosion resistance.

FIG. 1 illustrates isothermal time-temperature-transformation (TTT) diagrams for such an alloy, in particular an AISI-2205 duplex stainless steel. When such an alloy is maintained at conditions of time and temperature within the envelop of its particular TTT curve the individual elements forming the alloy tend to segregate from one another, with some of these elements combining with one another to form discrete intermetallic phases. Thus, each curve in FIG. 1 shows how much (i.e., 1%, 3%, 5%, and 10%) of the deleterious intermetallic sigma phase will form in this alloy when held at a particular temperature for a particular time. For example, FIG. 1 shows that holding this alloy at a temperature of about 860° C. for a soak period of about 2 minutes leads to the precipitation of 1% sigma phase in the alloy. Likewise, holding this alloy at this same temperature for about 7 minutes causes the formation of 5% sigma phase.

The extrapolation of the upper portion of TTT-curves to very long times yields an upper critical temperature above which intermetallic phases are thermodynamically not stable. The extrapolation of the lower portion of TTT-curves to very long times leads to a lower critical temperature below which intermetallic phases do not form for kinetic reasons. The temperature range defined by the upper and lower critical temperatures is called the critical temperature range for intermetallic phase formation. If the alloy is held at a temperature above the critical range, all of the elements in the alloy including those already present in intermetallic phases, tend to redistribute themselves into a uniform solid solution. Meanwhile, once the alloy is at a temperature below the critical range, the elements in the alloy are completely immobile with respect to one another no matter how long the alloy is held at that temperature.

The presence of these intermetallic phases in more than insignificant amount is detrimental to the properties of the alloy. As a result, it is standard practice in industry to subject hot forgings made from highly alloyed metals to a post-forge solution annealing treatment. Solution annealing involves heating an alloy up to, and maintaining the alloy at, an elevated temperature above the upper critical temperature for intermetallic phase formation. As a result, the atomic elements which have formed the intermetallic phases go back into solid solution with all the other elements of the alloy. Thereafter, the alloy is rapidly quenched through its critical temperature range so that formation of these intermetallic phases is avoided or at least minimized.

This is illustrated in FIG. 2, which shows continuous cooling curves, or "CCT curves," for this alloy. For example, FIG. 2 shows that, if such an alloy is cooled from 950° C. to below 600° C. according to the cooling regime represented by the solid line in this figure, it will develop about 1% deleterious sigma phase. On the other hand, if the alloy is cooled by the cooling regimes represented by the other lines in this figure, it will develop about 3%, 5% or even 10% of this deleterious sigma phase depending on which cooling rate is followed.

Because of the time and complexity involved, post forge solution annealing is expensive. In addition, it may also lead to various technical and commercial problems such as surface oxidation, lower mechanical properties due to grain growth, added production time and cost and negative environmental impact including consumption of energy and cooling water. Accordingly, it would be desirable to eliminate post forge solution annealing altogether, if possible.

SUMMARY

In accordance with this invention, it has been found that the post-forging solution anneal step normally carried out on hot forgings made from highly alloyed metals can be eliminated while simultaneously avoiding problems associated with detrimental intermetallic phases by adopting a number of specific features in connection with the way the forging is made.

Thus, this invention provides a process for making a hot forging from a highly alloyed metal comprising (1) selecting as the billet to be forged only those billets which are essentially free of detrimental intermetallic phases, (2) heating the billet up to its forging temperature in a manner so that the heated billet is free or essentially free of deleterious intermetallic phases, (3) carrying out forging in a manner so that no intermetallic phases form in the core of the billed and forging made therefrom during this step, and (4) cooling the forging so obtained rapidly enough to substantially prevent formation of any intermetallic phases.

DETAILED DESCRIPTION

Definitions

Figure 1:
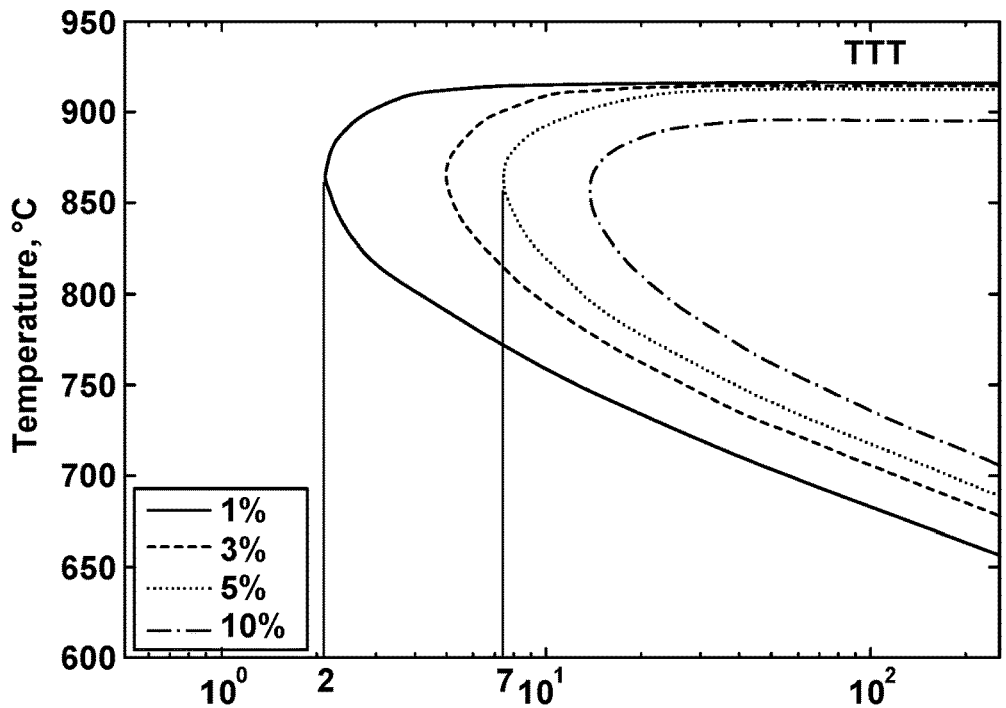
FIG. 1 is an isothermal time-temperature-transformation (TTT) diagram for an AISI-2205 duplex stainless steel alloy.

Unless otherwise clear from context, the following terms used in this disclosure will have the following meanings:

"Billet" means the piece of metal on which the forging steps of the inventive process are carried out. Normally, a billet is obtained by subdividing a piece of forging stock into sections of appropriate size.

"Forging stock" means a metal product which has been obtained by subjecting an ingot to one or more metal working operations such as hot or cold rolling, forging or the like to reduce its thickness dimension. In many instances, forging stock will be in the form of a rod, bar or strip whose length is many times its thickness.

"Highly alloyed metal" means a metal alloy which is formed from a base metal such as Fe or Ni and which includes a substantial amount of one or more other metal elements such that the metal alloy tends to form intermetallic phases when heated to elevated temperature.

"Hot forging" means a metal product whose shape has been obtained, at least in part, by subjecting a metal billet which has been heated to a forging temperature above the upper critical temperature for intermetallic phase formation to substantial localized compressive forces. These substantial localized compressive forces are normally delivered by a hammer or other suitable implement, but may also be delivered by deforming the billet between two mating closed dies. Specific forging operations include roll forging, swaging, cogging, open-die forging, closed-die forging, impression-die forging, press forging, automatic hot forging, radial forging, and upset forging.

"Ingot" means the metal product obtained when a molten metal is solidified. When such a product is continuously cast, "ingot" will also be understood to include longitudinal sections of such a product. "Ingot" is intended to distinguish products which are obtained by reducing the thickness of an ingot by some form of hot or cold working procedure such as hot or cold rolling, forging, and the like.

"Substantially free of intermetallic phases" means a concentration of intermetallic phases in a metal product which is so small that it does not adversely affect the properties of the metal product in any significant way. Most commercial metal products, including intermediate products, are made to have a desired set of properties as determined by product specifications for that particular metal product. A metal product which is substantially free of intermetallic phases will be understood to mean a metal product which, although containing deleterious intermetallic phases which adversely affect its properties, contains these deleterious intermetallic phases in concentrations which are so small that the metal product still meets its product specifications.

Highly Alloyed Metals

The inventive forging process is carried out on highly alloyed metals.

Thus, in one embodiment, the inventive forging process is carried out on ferrous based alloys which contain significant amounts of additional metal elements other than Fe. Examples include martensitic stainless steels, ferritic stainless steels, austenitic stainless steels, highly alloyed austenitic stainless steels, super austenitic stainless steels, and austenitic-ferritic stainless steels such as lean duplex, duplex, super duplex, and hyper duplex stainless steels.

Steels of particular interest in this regard are those exhibiting a CP value of 500 or more. The CP value is a relative indication of the kinetics of precipitation of intermetallic phases in an alloy. It is described in U.S. Pat. No. 5,494,636, the disclosure of which is incorporated herein by reference. The CP value of an alloy can be calculated using the following formula, wherein the percentages are weight percentages based on total alloy weight:

$$CP=20\times\% \text{ Cr}+0.3\times\% \text{ Ni}+30\times\% \text{ Si}+40\times\% \text{ Mo}+5\times\% \text{ W}+10\times\% \text{ Mn}+50\times\% \text{ C}-200\times\% \text{ N}.$$

Alloys having CP values of less than 500 are not especially prone to developing deleterious intermetallic phases rapidly when heated to elevated temperatures. On the other hand, those which exhibit CP values of 500-700 show some tendency to do so, while those exhibiting CP values of 700-750 are even more prone to do so. Meanwhile alloys having CP values of 750-800 and above are especially prone to develop these deleterious intermetallic phases when heated to elevated temperatures. In accordance with this invention, billets made from all such alloys and especially those exhibiting CP values of 500-700, 701-750 and 751-800 and above can be can be used as raw materials for the inventive process to make hot forgings exhibiting little or no deleterious intermetallic phases, even though such forgings have been made without a post-forging solution anneal.

Of special interest in this regard are the superstainless steels, i.e., stainless steels which contain about 19 to 26 wt. % Cr and 3 to 8 wt. % Mo.

Basically, there are two types of superstainless steels, those that exhibit an austentic phase structure and those that exhibit a duplex phase structure. Superstainless steels exhibiting an austenitic phase structure normally contain about 19 to 25 wt. % Cr and 5 to 8 wt. % Mo and are sometimes referred to as "super-austenitc 6-moly alloys." Examples of such steels include AISI-N08367 (alloy 6XN or AL6XN), AISI-S31254 (alloy 254), AISI-N08925 (alloy 1925hMo) and AISI-S31266 (alloy 866). Superstainless steels exhibiting a duplex phase structure normally contain about 24 to 26 wt. % Cr and 3 to 5 wt. % Mo and are sometimes referred to as "superduplex" stainless steels. Examples of such steels include AISI-S32750 (alloy 2507) and AISI-S32760 (alloy Zeron 100).

Additional metal alloys on which the inventive forging process can be carried out are the nickel based alloys which contain at least about 2 wt. % Mo and at least 18 wt. % Cr. Specific examples include alloys AISI-N0820 (alloy C20 or "Carpenter 20"), AISI- N08031 (alloy 31) and AISI-N08825 (alloy 825).

Still other alloys on which the inventive forging process can be carried out are the "super-austenitc 7 moly" alloys, examples of which include AISI-S32654 (alloy 654) and AISI-S531277 (alloy 27-7Mo), the "highly alloyed austentic" stainless steels such as AISI-N08904 (alloy 904L), the "lean duplex" alloys such as AISI-532101 (alloy LDX 2101), regular duplex alloys such as AISI-S32205 (alloy 2205), the "hyper duplex" alloys such as AISI-S33207 (alloy SAF 3207) and the well-known "conventional" austenitic stainless steels such as AISI-S31600 (alloy 316) and AISI-S31700 (alloy 317).

Finally, also of special interest are all of the alloys identified in ASTM A182 which are said to require solution annealing. See, especially, Table 1 of this ASTM test method.

Starting Material

In accordance with this invention, it has been found that hot forgings made from highly alloyed metals which exhibit a desirable combination of properties including mechanical strength and superior corrosion resistance can be produced without subjecting the forging to solution annealing after it has been made, as previously thought necessary, by adopting a number of separate features in connection with the way the forging is made.

The first of these features, which may be regarded as optional but is still important, relates to the manner in which the billet on which the inventive process is carried out is selected. In accordance with this feature, only those billets that are essentially free of detrimental intermetallic phases are selected for this purpose.

As indicated above in connection with FIG. 1, when a highly alloyed metal such as a duplex stainless steel is maintained within its critical temperature range for a sufficiently long time (i.e., within the envelop defined by its particular TTT curve), some of the elements forming the alloy will combine with one another to form discrete intermetallic phases. These intermetallic phases, if present in more than insignificant amounts, are the underlying reason why a hot forging made from such an alloy exhibits poor properties if has not been solution annealed after forging.

Therefore, it would seem to make sense to start with a billet that is free or essentially free of these deleterious intermetallic phases.

However, in some instances in commercial practice, the forging stock obtained from a foundry is not necessarily in a fully solution annealed state. For many alloys, the elevated temperatures commonly used to hot work an ingot, or to hot-roll barstock, of the alloy into forging stock are roughly the same as the elevated temperatures needed to solution anneal the alloy. In addition, it is common practice in the foundry to rapidly quench forging stock as part of its manufacturing operation. As a result, the assumption can be made that the forging stock obtained will be free or substantially free of deleterious intermetallic phases.

However, the hot working temperatures actually used in particular foundry operations may be less than the minimum temperature required to achieve effective solution anneal. In addition, rapid quenching may not have been rapid enough. So there is a real risk that such a forging stock which has not been separately solution annealed will contain substantial amounts of deleterious intermetallic phases, since its thermal history may have been insufficient to remove all of these materials.

In other instances in commercial practice, the forging stock is solution annealed at the foundry before being shipped to the customer. Sometimes, the foundry simply assures the customer that this forging stock is free of deleterious intermetallic phases because it was solution annealed before being shipped. However, in these situations, there is still a risk that the solution annealing process actually carried out was insufficient to remove all or essentially all of the deleterious intermetallic phases that might have been present.

In still other instances in commercial practice, the foundry provides the customer with a certified analysis of the composition, properties and phase structure of the forging stock being delivered based on actual analytical tests carried out on this particular piece of forging stock or on representative samples of this forging stock. In these situations, the risk that the forging stock received still contains deleterious intermetallic phases is less.

In accordance with this first feature of the invention, care is taken to insure that only those billets that are essentially free of detrimental intermetallic phases are selected for being processed by the inventive forging process. In practical terms, this cannot be done solely by relying on the factory's processing history and/or assurances by the foundry relating to solution anneal of the forging stock from which these billets are derived. Rather, one or more additional steps are necessary to conclude that this forging stock, and hence the billets derived from this forging stock, are in fact free or essentially free of these deleterious intermetallic phases.

In accordance with one of these additional steps, a certified analysis of the phase structure of the billet, the forging stock from which the billet is derived, or at least representative samples of this forging stock are necessary before it can be assumed that the billet selected for use in the inventive hot forging process is, in fact, free or essentially free of deleterious intermetallic phases. The party carrying out the inventive hot forging process can, itself, obtain such a certified analysis. Additionally or alternatively, the party carrying out the inventive hot forging process may also rely to such a certified analysis obtained from its foundry/supplier in those circumstances in which the party finds it reasonable to rely on the information received from its foundry supplier.

Regardless of the particular procedure adopted, it is important that the starting material of the inventive process, i.e., the billet on which the inventive hot forging process is practiced, be selected to be free or essentially free of the deleterious intermetallic phases that give rise to poor alloy properties in the ultimate hot forging product produced.

In certain embodiments of this invention, still another step that can be taken to help insure that the hot forgings produced by the inventive process are free or essentially free of deleterious intermetallic phases is to restrict the maximum thickness of the hot forging which is produced. Because of inherent heat transfer restrictions, the larger a forging becomes, the more difficult it is to rapidly cool its core. What this means in practical terms is that, as the thickness of a forging becomes larger, cooling the core of the forging after solution anneal rapidly enough to prevent intermetallic phases from forming becomes more difficult or even impossible. So, in some embodiments of this invention, the maximum thickness or diameter of the forging being made is restricted to a value which is small enough to avoid this heat transfer problem from occurring.

Accordingly, in these embodiments of the invention, the maximum thickness or diameter of the hot forging being made is restricted to 12 centimeters, 9 centimeters, 6 centimeters, 5 centimeters, 4 centimeters or even 3 centimeters.

Heating the Billet

Another feature of the inventive process relates to the manner in which the billet is heated up to its forging temperature.

Figure 3:
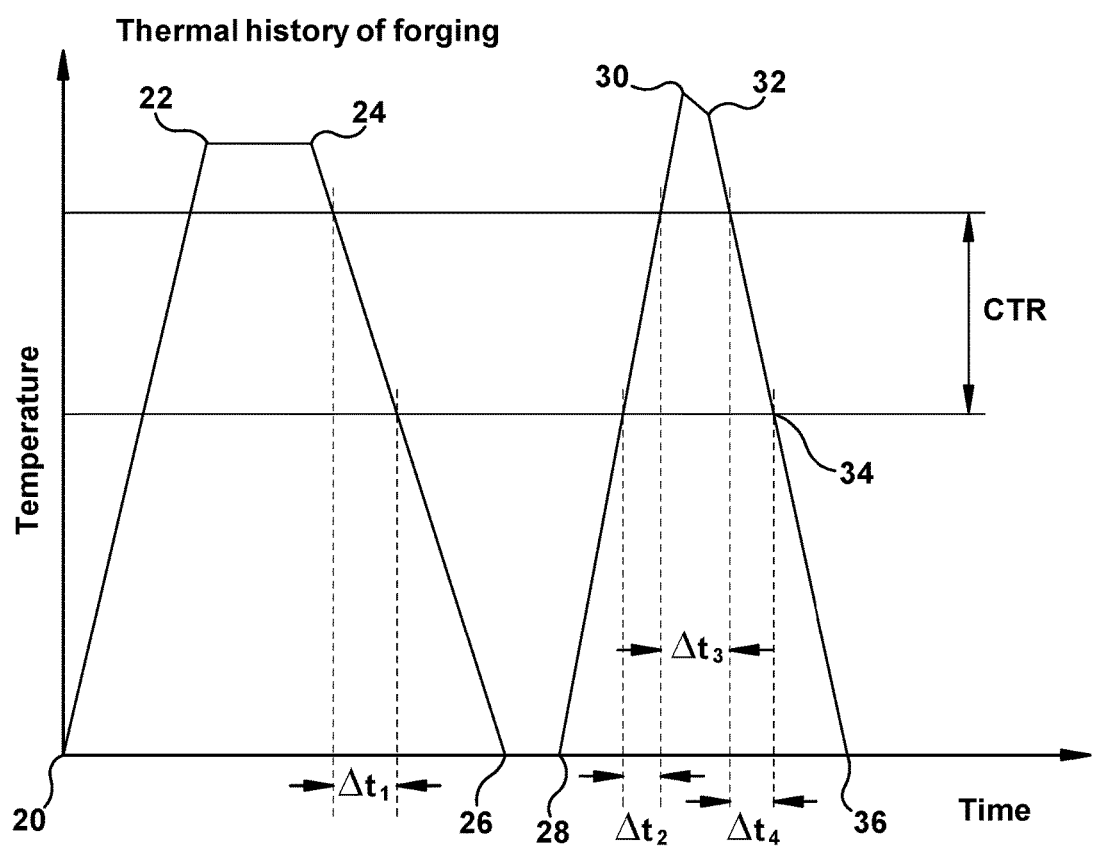
FIG. 3 is a thermal history diagram illustrating the relationship between time and temperature in the manufacture of a hot forged product in accordance with the invention.

FIG. 3 is a thermal history diagram illustrating the relationship between time and temperature in the manufacture of a hot forged product. For completeness, FIG. 3 includes the solution annealing step normally carried out on forging stock at the foundry to insure that it is free or essentially free of deleterious intermetallic phases, as discussed in the preceding section of this disclosure. In addition, for the purposes of this illustration, it is assumed that this forging stock has been derived from an ingot (or an intermediate product produced by hot working the ingot to reduce its thickness) which has been allowed to cool to room temperature.

Starting at point 20 in which the forging stock is at or near room temperature, the forging stock is subjected to a solution annealing procedure in which it is first heated to point 22 which is above the critical temperature range CTR of the alloy. It is then maintained at this temperature for a suitable period of time to insure that all or essentially all of the deleterious intermetallic phases that might be present in the alloy redissolve. At that time, when point 24 is reached, the forging stock is then rapidly quenched, typically by contact with water or other cooling liquid, back down to room temperature at point 26. As can be seen from this figure, during this rapid quenching procedure, the forging stock spends a certain amount of time, denoted by $\Delta t_1$, in the critical temperature range CTR of the alloy.

As discussed in the preceding section of this disclosure, care is taken to insure that the billets on which the inventive process is carried out are free or essentially free of detrimental intermetallic phases. What this means in terms of the forging stock illustrated in FIG. 3 is that the period of time the alloy is held above its critical temperature range CTR, as represented by line extending between points 22 and 24, is long enough to redissolve any deleterious intermetallic phases that might have been originally present in this forging stock and, in addition, that $\Delta t_1$ is short enough so that essentially no detrimental intermetallic phases form as this forging stock cools through its critical temperature range CRT.

Turning now to the heating step of the inventive process, this heating step is represented by the line extending between points 28 and 30 in FIG. 3. In accordance with this second feature of the inventive process, this heating step is done in a manner so that when this heating step is completed, which will normally be when the heated billet is removed from the heating source used to carry out this heating step, the heated billet obtained is free or essentially free of deleterious intermetallic phases.

Preferably, this is done by heating the billet to its forging temperature as rapidly as possible, at least during the time period the billet remains within its critical temperature range, which is denoted by $\Delta t_2$ in this figure. For this purpose, heating will normally be done by resistance or induction heating, since radiant heating inside a furnace is just too slow. Heating the billet as rapidly as possible while it is in its critical temperature range greatly minimizes and normally eliminates completely or at least essentially completely, any formation of deleterious intermetallic phases during this time period.

In current commercial practice, as indicated above, it is uncertain in many instances if the billet being used is free or essentially free of deleterious intermetallic phases. For this reason, it is not uncommon for these billets to be heated up to forging temperatures fairly slowly, as this prevents cracking during heat up of billets containing these intermetallic phases in any significant amounts. Indeed, one manufacturer expressly recommends that at least one of its highly alloyed metal products, super duplex 2507 stainless steel, be heated slowly for this reason. See, http://smt.sandvik.com/en/materials-center/material-datasheets/billets/sandvik-saf-2507/. During this slow heating, additional intermetallic phases will form when the billet is within its the critical temperature range.

In contrast to this approach, in the inventive process, the billet is preferably heated up as rapidly as possible to avoid formation of any new amounts of deleterious intermetallic phases to the greatest extent possible. The primary reason this can be done is because the billet starting material on which the inventive hot forging process is carried out is free or essentially free of these intermetallic phases, as discussed in the preceding section of this disclosure. As a result, the heated billet obtained when this heating step has been completed continues to be free or essentially free of deleterious intermetallic phases.

A second way this heating step can be carried out so as to produce a heated billet which is free or essentially free of deleterious intermetallic phases when removed from its heating source is to continue heating the billet above its critical temperature range long enough to redissolve any deleterious intermetallic phases that may be present. For example, keeping the temperature of the billet above the upper critical temperature for intermetallic phase formation for a longer time period than the time period during which the billet was within the critical temperature range of the alloy during billet heat up will generally insure that any deleterious intermetallic phases that might have formed during heat up are eliminated before the forging step begins. Although this second way of heating requires additional time and heating, it is nonetheless also effective in producing heated billets which are free or essentially free of deleterious intermetallic phases.

Forging the Billet

In the next step of the inventive hot forging process, the heated billet is converted into a forging by the application of substantial hot working. This can be done by any known hot working technique including roll forging, swaging, cogging, open-die forging, closed-die forging, impression-die forging, press forging, automatic hot forging, radial forging, and upset forging.

In FIG. 3, this forging step is represented by the line extending from points 30 to 32. As shown there, this forging step begins at point 30, when the heated billet is removed from its heating source and ends at point 32 when rapid cooling of the forging produced begins. In accordance with still another feature of the inventive hot forging process, this hot forging step is accomplished in such a way that no intermetallic phases form in the billet/forging during this step, or at least in the core of this billet/forging. This, in turn, is accomplished by insuring that the temperature of this billet/forging, or at least its core, does not drop below the upper boundary of its critical temperature range CTR at any time during this entire forging step.

In commercial practice, this forging step normally involves a number of different operations including removing the billet from its heating source, transferring the heated billet to the forging apparatus, hot forging the billet, removing the forging so formed from the forging apparatus, transferring the forging to its rapid cooling station and initiating the rapid cooling operation. For a variety of reasons, including lengthy forging operations, large forgings and inefficient processing, completion of this forging step can take several tens of minutes to hours or even longer. However, as illustrated in FIG. 3, as soon as the billet is removed from its heating source at point 30 it begins to cool rapidly. As a result, it is not uncommon in conventional practice that the temperature of the billet/forging, or at least a substantial portion of the billet/forging, drops below the upper boundary of its critical temperature range CRT for a not-insignificant period of time.

If this does occur, in some instances in conventional practice, nothing is done based on the notion that any deleterious intermetallic phases which have been introduced at this time can be removed by the subsequent solution anneal that is always done on these products. More commonly, however, the forging is reheated to cause at least some of the deleterious intermetallic phases which have formed to redissolve before rapid cooling begins.

In accordance with this feature of the inventive process, this conventional practice of relying on subsequent solution anneal and/or reheating the billet/forging during its forging step is avoided as being unnecessary, as keeping the temperature of the billet/forging above the upper boundary of its critical temperature range CRT at all times during this entire forging step insures that no deleterious intermetallic phases form during this time.

In theory, the most straightforward way of insuring that the temperature of billet/forging remains above the upper boundary of its critical temperature range CRT at all times during this entire forging step would appear to be to monitor the temperature of the billet at various times and/or stages of this forging step. In practice, however, this can prove to be impractical for a variety of reasons. Therefore, in terms of process control, the easiest way of insuring that the temperature of billet/forging remains at this desired level is to monitor the time between the start and end of this forging step, i.e., the period of time which elapses between points 30 and 32 in FIG. 3. In addition to monitoring this elapse of time, in some embodiments of this invention, the temperature of the billet at point 30, i.e., the temperature of the billet when it leaves the heating source in which it was heated during the above-noted heating step, can also be monitored as well.

In this regard, for each particular hot forging that will be made, the length of time it will take that billet/forging to cool, after leaving its heating source, to a temperature defined by the upper boundary of its critical temperature range, CRT, can be readily calculated. Therefore, the easiest way of insuring that the temperature of the billet/forging remains above this upper boundary at all times during the entire forging step is by insuring that rapid quenching of forging begins before this length of time has expired.

Thus, it is contemplated that the entire forging step of the inventive process, from beginning to end, will be carried out in less than 3 minutes, more commonly in less than 2 minutes, less than 90 seconds, less than 75 seconds, less than 60 seconds, less than 45 seconds or even less than 30 seconds. Of course, carrying out this step so quickly normally requires that the billet/forging be fairly small, as a practical matter, which is the case for many hot forgings made from the heavily alloyed metals contemplated by this invention.

In this regard, skilled metallurgists understand that, because of inherent heat transfer limitations, the rate at which the core of a metal workpiece heats or cools is normally slower than the rate at which surface of the workpiece heats or cools. In addition, skilled metallurgists further understand this difference becomes greater as the size of the workpiece becomes bigger. Furthermore, skilled metallurgists also understand that a forge hammer or other hot working implement can act as a heat sink, in effect rapidly sucking the latent heat out of the particular surfaces of a billet which are struck by these implements, thereby causing these billet surfaces to cool very rapidly. For these reasons, skilled metallurgists understand that, in the inventive process as in many other metallurgical processes in which a workpiece is being heated or cooled, the temperature of the interior or core of the billet/forgings being processed may be different the temperature at the surface of this billet/core.

Accordingly, it is important to understand that, in the present invention, when we say that the temperature of billet/forging remains above the upper boundary of its critical temperature range CRT at all times during this entire forging step, we do not mean that every portion of the billet/forging always remains above this temperature. Rather, what we mean is that it is possible that the temperature of some portion of the billet/forging at some point in time during the forging step could drop below this temperature for some period of time. However, if this does happen, nonetheless, the time over which this occurs as well as the portion of the billet/forging in which this temperature drop occurs is so small that its effect on the product hot forging obtained is insignificant in the sense that this product will still meet its applicable product specifications.

Thus, it will be appreciated that, in some embodiments of this invention, especially when the parts being made are small, the temperature of all portions of the billet/forging will remain above the upper boundary of the critical temperature range CRT at all times during this entire forging step. In contrast, in other embodiments, especially when the parts become larger, the core of the billet/forging will remain above the upper boundary of the critical temperature range at all times, while some or all of the outer surfaces of billet forging may drop below this temperature for periods of time which are too short to enable deleterious intermetallic phases to form to any significant degree. It is also possible that in still other embodiments, even the core of the billet/forging may drop below this temperature for a very short period of time. However, this will likely occur only when the billet/forging is very small and, in addition, is less desirable than the other embodiments of the invention in which the temperature of the core, and preferably the temperature of the entire billet/forging is kept above the upper boundary of the critical temperature range CRT at all times during this entire forging step.

Other steps for insuring that the temperature of the billet/forging remains above the upper boundary of its critical temperature range CRT at all times during the entire forging step of the inventive process can also be used, including maintaining the equipment used for carrying out this step, or at least some of it, at elevated temperature which is high enough to prevent rapid cooling from ambient conditions.

Rapid Cooling

Once the forging step of the inventive process is completed, the forging obtained is rapidly cooled to a temperature which is below its critical temperature range CTR. In accordance with still another feature of the inventive process, this is done in a manner which is fast enough to prevent intermetallic phases from forming in any significant amount.

In FIG. 3, this rapid cooling step is represented by the line extending from points 32 to 34, although in actual practice the forging will normally be rapidly cooled down to a temperature approaching room temperature, as represented by point 36. As shown in FIG. 3, this rapid cooling step begins at point 32, when the hot forging is first contacted with a cooling medium and ends at point 34 when the hot forging has cooled to a temperature which is below the lower limit of its critical temperature range CTR. In accordance with this feature of the inventive process, cooling of the hot forging in this cooling step is accomplished so that the time the hot forging is within its critical temperature range CTR, which is denoted by $\Delta t_3$ in this figure, is so short that deleterious intermetallic phases do not have an opportunity to form, at least to any significant degree.

This can be done in any conventional way such as by contacting the hot forging with water or other cooling liquid, either by immersing the hot forging in the cooling liquid, by directing jets or sprays of the cooling liquid at the hot forging, or other suitable procedure.

In some embodiments of this invention, this is accomplished by immersing each hot forging into the cooling liquid individually or as a small number of small forgings having been made from the same billet, rather than as a large number of forgings which are typically quenched together after solution annealing.

In this regard, in conventional practice, the normal way of rapidly quenching hot forgings which are relatively small in size is to arrange a group of the hot forgings in a tray or basket or other holding device and then immerse the tray and all of its contents in the cooling liquid. This approach inherently slows the rapid cooling process down, not only because of the delays involved in arranging a group of hot forgings in its tray/holder, but also because the close packing of the hot forgings with respect to one another plus the mass of the tray or other holder reduces the effective heat capacity of the cooling liquid touching the surfaces of each hot forging. These problems are avoided if each hot forging is individually immersed into the cooling liquid, which speeds the rate at which cooling of each forging occurs.

Thus, in accordance with this feature of the inventive process, it is contemplated that when the inventive process is carried out to make multiple hot forgings which are relatively small in the sense of weighing no more than 5 kg, no more than 3 kg, no more than 2.5 kg, no more than 2 kg, no more than 1.5 kg, no more than 1 kg, or even no more than 0.5 kg, these hot forgings are rapidly cooled by immersing each in a pool of cooling water or other liquid individually. Normally, multiple hot forgings of this type will be made serially, i.e., one after the other, and so it is further contemplated that these individual hot forgings will be individually immersed in cooling liquid in the same serial fashion, as this not only speed the rate at which cooling occurs, as mentioned above, but also minimizes the lag time between completion of forging and initiation of rapid cooling for each forging.

In other situations, multiple forgings are made from the same billet, with multiple billets being processed serially to make these multiple hot forgings. In this situation, because the multiple forgings that are made from the same billet are made at essentially the same time, the group of forgings made from the same billet can be rapidly cooled together. However, in this instance, it is still preferable to rapidly cool each group of such forgings individually, in the order each group is made.

Inventive Process as a Whole

From the foregoing, it can be seen that deleterious intermetallic phases can form during any stage in the manufacture of a hot forged product, starting with how the forging stock from which the product is made is processed in the foundry and ending with how the product is rapidly cooled after forging. In addition, from the foregoing, it can also be seen that an important aspect of the inventive process is that in each of these manufacturing stages, care is taken to eliminate or at least minimize the amount of these deleterious intermetallic phases that form.

Figure 2:
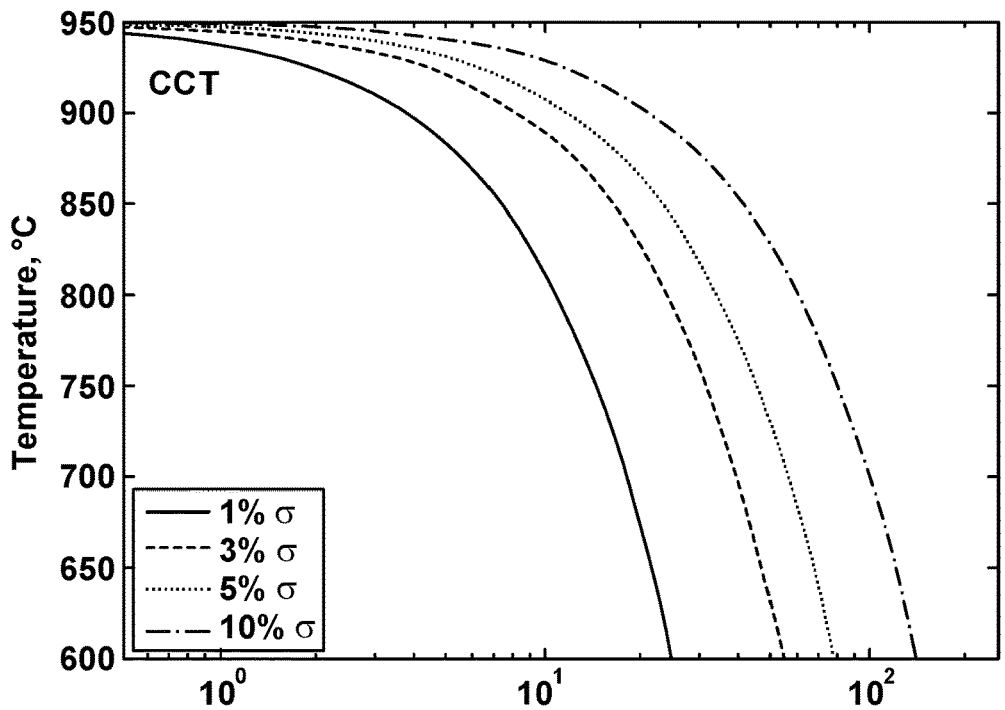
FIG. 2 is a diagram of the continuous cooling curves, or "CCT curves," for the alloy or FIG. 1.

To this end, it should be appreciated that what is most important in carrying out the inventive process is that the ultimate hot forged product obtained is free or essentially free of these deleterious intermetallic phases in the sense that it meets its applicable product specifications. For example, the particular AISI-2205 alloy whose TTT diagrams and CCT curves are provided in FIGS. 1 and 2, can be made into a hot forging which is suitable for use in many applications (chemical processing, scrubbers, pulp mills, bleach washers, food processing, oil field piping, etc.). Likewise, forgings with even greater strength and corrosion resistance can be produced from super duplex stainless steel for which the relevant specifications provide that this hot forging exhibit a weight loss of no greater than 0.0004 g/cm$^2$ and no pitting, as determined by ASTM-G48 and a 0.2% Yield Strength of at least 80 ksi, per ASTM-A182. These requirements can be met by a hot forging made from this super duplex alloy that is "essentially free" of this intermetallic phase in the context of this disclosure.

Accordingly, it should also be appreciated that it is not essential that each step of the inventive process be carried out to minimize formation of these intermetallic phases to the greatest extent possible or avoid formation of these intermetallic phases altogether. Rather, all that is necessary is that a combination of features be adopted, as discussed in this disclosure, so that the concentration of these deleterious intermetallic phases in the hot forged product ultimately produced is low enough so that it still meets its applicable product specifications.

Although only a few embodiments of this invention have been described above, many modifications can be made without departing from the spirit and scope of this invention. All such modifications are intended to be included within the scope of this invention, which is to be limited only by the following claims.

The invention claimed is:

1. In a process for making a forging from a highly-alloyed metal in which (a) a billet made from the highly-alloyed metal is heated up to a forging temperature in a heating source, (b) the billet so heated is removed from its heating source and then forged, thereby forming a heated forging, (c) the heated forging so made is then cooled to below the critical temperature range of the highly-alloyed metal by contact of the heated forging with a cooling liquid, and (d) the cooled forging so made is then subjected to a post-forging solution anneal followed by rapid quench for reducing the amount of any deleterious phases that may have formed thereby insuring that the forging so made meets predetermined product specifications applicable to forgings made from said highly-alloyed metal, the improvement for simplifying the process comprising eliminating step (d) by carrying out steps (a), (b) and (c) in a manner which minimizes formation of deleterious phases sufficiently so that the forging obtained in step (c) already meets said predetermined product specifications including
  (1) selecting as the billet to be forged only those billets which are essentially free of deleterious intermetallic phases,
  (2) heating the billet in heating step (a) by means of resistance or induction heating thereby avoiding the need to redissolve any deleterious intermetallic phases that may have formed during this step,
  (3) carrying out forging step (b) and cooling step (c) so that the period of time which elapses between the time when the heated billet is removed from its heating source to the time when the heated billet is contacted with the cooling liquid is less than 3 minutes, and
  (4) maintaining the temperature of the core of the billet during forging step (b) above the upper boundary of the critical temperature range of the highly-alloyed metal so that deleterious phases do not form in the core of the billet during this forging step, and
further wherein the highly-alloyed metal exhibits a CP value of 500 or more wherein the CP value of the alloy is given by the following formula:

$$CP = 20 \times \% \ Cr + 0.3 \times \% \ Ni + 30 \times \% \ Si + 40 \times \% \ Mo + 5 \times \% \ W + 10 \times \% \ Mn + 50 \times \% \ C - 200 \times \% \ N.$$

2. The process of claim 1, wherein steps (a), (b) and (c) are carried out in a manner so that the concentration of precipitated sigma phase in the highly-alloyed metal forming the forging obtained in step (c) is less than 1%.

3. The process of claim 1, wherein the highly-alloyed metal exhibits a CP value of 700 or more.

4. The process of claim 2, wherein the highly-alloyed metal is a super stainless steel containing about 19 to 26 wt. % Cr and 3 to 8 wt. % Mo.

5. The process of claim 1, wherein the highly-alloyed metal is a super-austenitic 6-moly alloy selected from AISI-N08367 (alloy 6XN or AL6XN), AISI-S31254 (alloy 254), AISI-N08925 (alloy 1925hMo) and AISI-S31266 (alloy B66), whereby the forging obtained in step (c) already meets the product specifications for that super-austenitic 6-moly alloy.

6. The process of claim 1, wherein the highly-alloyed metal is a superduplex stainless steel selected from AISI-S32750 (alloy 2507) and AISI-S32760 (alloy Zeron 100), whereby the forging obtained in step (c) already meets the product specifications for that superduplex stainless steel.

7. The process of claim 1, wherein the highly-alloyed metal is an alloy selected from AISI-S32654 (alloy 654), AISI-S31277 (alloy 27-7Mo) and AISI-N08904 (alloy 904L), whereby the forging obtained in step (c) already meets the product specifications for that alloy.

8. The process of claim 1, wherein the super stainless steel exhibits a duplex phase structure and contains about 24 to 26 wt. % Cr and 3 to 5 wt. % Mo, and further wherein steps (a), (b) and (c) are carried out in a manner so that the highly-alloyed metal forming the hot forging obtained in step (c) exhibits a weight loss of no greater than 0.0004 g/cm$^2$ and no pitting, as determined by ASTM-G48, and a 0.2% Yield Strength of at least 80 ksi, as determined by ASTM-A182.

9. The process of claim 1, wherein the highly-alloyed metal is a nickel based alloy containing at least 2 wt. % Mo and at least 18 wt. % Cr.

10. The process of claim 1, wherein the highly-alloyed metal is a nickel based alloy selected from AISI-N0820 (alloy C20 or "Carpenter 20"), AISI-N08031 (alloy 31) and AISI-N08825 (alloy 825), wherein the forging obtained in step (c) already meets the product specifications for that nickel based alloy.

11. The process of claim 1, wherein the period of time which elapses between the time when the heated billet is removed from its heating source to the time when the heated billet is contacted with a cooling liquid is less than 90 seconds.

12. The process of claim 11, wherein the period of time which elapses between the time when the heated billet is removed from its heating source to the time when the heated billet is contacted with a cooling liquid is less than 1 minute.

13. The process of claim 1, wherein the maximum thickness of the forging being made is no greater than 5 cm.

14. The process of claim 1, wherein the maximum thickness of the forging being made is 4 cm and the maximum weight of the forging being made is 3 kg.

15. The process of claim 1, wherein the highly-alloyed metal is a super-austenitic 6-moly alloy or a super duplex stainless steel exhibiting a duplex phase structure and containing about 24-26 wt. % Cr and 3-5 wt. % Mo.

16. The process of claim 1, wherein the highly-alloyed metal is AISI-N08367 (alloy 6XN or AL6XN).

17. The process of claim 1, wherein the highly-alloyed metal is essentially free of cobalt.

* * * * *